(12) United States Patent
Mussro et al.

(10) Patent No.: US 8,962,208 B2
(45) Date of Patent: Feb. 24, 2015

(54) PREDICTIVE CATHODE COMPRESSOR SPEED CONTROL IN A FUEL CELL POWER SYSTEM

(71) Applicant: GM Global Technology Operations LLC, Detroit, MI (US)

(72) Inventors: Joseph Mussro, Pittsford, NY (US); Yanyan Zhang, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 13/660,073

(22) Filed: Oct. 25, 2012

(65) Prior Publication Data

US 2014/0120445 A1    May 1, 2014

(51) Int. Cl.
   *H01M 8/04* (2006.01)

(52) U.S. Cl.
   USPC ............................................ 429/444

(58) Field of Classification Search
   None
   See application file for complete search history.

(56) References Cited

U.S. PATENT DOCUMENTS

| | | | |
|---|---|---|---|
| 4,838,020 A * | 6/1989 | Fujitsuka | 60/784 |
| 6,815,106 B1 * | 11/2004 | Salvador et al. | 429/427 |
| 2001/0024746 A1 * | 9/2001 | Ueda et al. | 429/22 |
| 2003/0030395 A1 * | 2/2003 | Hampo et al. | 318/432 |
| 2005/0095474 A1 * | 5/2005 | Rainville | 429/22 |
| 2005/0118475 A1 * | 6/2005 | Ueda et al. | 429/26 |
| 2006/0127720 A1 * | 6/2006 | Ferrall et al. | 429/22 |

OTHER PUBLICATIONS

Chen et al., Two-degree-of-freedom controlling method for proton exchange membrane fuel cell system, involves combining sub-optimal output feedback control method and feedforward control method for controlling fuel cell system, Jun. 27, 2012, Derwent 2012-J90173 (CN 102520613).*

* cited by examiner

*Primary Examiner* — Patrick Ryan
*Assistant Examiner* — Jose Colucci Rios
(74) *Attorney, Agent, or Firm* — Dinsmore & Shohl LLP (57) ABSTRACT

A method and device for predictively controlling the speed of a compressor used in conjunction with a fuel cell stack. Feedforward command signals are generated based on fuel cell stack setpoints that are based on stack humidification requirements. A pressure drop model uses these setpoints to determine a compressor outlet pressure setpoint change brought about by an operational transient. A recursive approach is used to solve for one or more future or desired compressor operating conditions. The results of this recursive approach are used to determine the feedforward speed command of the compressor, where known operational parameters (such as can be found on a compressor map) may be used. This permits rapid changes in compressor speed to comply with the new operating point of the fuel cell system that is brought about by the operational transient.

20 Claims, 6 Drawing Sheets

PREDICTIVE CATHODE COMPRESSOR SPEED CONTROL IN A FUEL CELL POWER SYSTEM

BACKGROUND OF THE INVENTION

The present invention relates generally to controlling delivery of a reactant in a vehicle fuel cell system, and more particularly to systems and methods for predictively controlling the operational speed of a compressor being used to deliver the reactant to fuel cells within the system.

Fuel cells are one alternative to using gasoline or related petroleum-based sources as the primary source of energy in vehicular propulsion systems. In particular, by combining reactants in an electrochemical reaction within the fuel cell, electric current can be generated and used to power a motor or perform other useful work. In one form, the motor being powered by the electric current may propel the vehicle, either alone or in conjunction with a petroleum-based combustion engine.

In a typical fuel cell, hydrogen or another reactant gas is supplied to the anode of the fuel cell, while an oxygen-based reactant (for example, ambient air) is supplied to the cathode of the fuel cell. The hydrogen is catalytically broken into electrons and positively charged ions such that an electrolyte layer that separates the anode from the cathode allows the ions to pass to the cathode while preventing electrons from doing the same. Instead, electrons are routed around the electrolyte layer through a load and back to the cathode, allowing electrical power to be harnessed. At the cathode, the ions, electrons, and supplied oxygen or air are typically combined to produce water and heat. In automotive applications, individual fuel cells may be arranged in series or parallel as a fuel cell stack in order to produce a higher voltage or current yield. Furthermore, still higher yields may be achieved by combining more than one stack.

To improve the delivery of the reactant gases, pressurized sources are often used. For example, the air being delivered to the cathode side of a fuel cell system is often by way of a compressor, where ancillary equipment—such as valves, controllers or the like—is used to regulate the airflow between the compressor and fuel cell. An inherent attribute of such compressors (at least as they relate to cathode-side operation) is that the cathode's pressure control and flow control are coupled together. As such, stable operation can often be best achieved through feedforward control, where a command signal based on a mathematical model (or related algorithm) of the known operational characteristics of the compressor being adjusted is sent to the compressor to affect a change therein.

Despite the advantages of feedforward-based control strategies for compressors, certain operating conditions may jeopardize command signal accuracy. This is particularly acute during transients, as changes in cathode flow and pressure setpoints and slow response times may render an inaccurate prediction of the needed compressor speed. This mismatching of the compressor speed to the amount of reactant flow needed by the cathode in turn may result in prolonged unfavorable cathode stoichiometries that in turn can lead to excessive cathode drying and related harm to the cathode. As such, it remains challenging for control systems to regulate the transient operating conditions of a compressor used to deliver a reactant gas to the electrodes of a vehicular fuel cell system.

SUMMARY OF THE INVENTION

In accordance with an aspect of the present invention, a method of predictively controlling the speed of a compressor used to deliver reactant to a fuel cell system is disclosed. In one particular form, the method includes configuring or otherwise operating a controller to send a feedforward speed control signal to the compressor to quickly regulate the stack flow for both up transients and down transients. In a preferred form, the method may be embodied in an algorithm or related mathematical model that includes determining optimal cathode stoichiometry and operating pressure setpoints based on humidification requirements for each of the fuel cell system's operating points, after which a pressure drop model that includes both laminar and turbulent elements is used in conjunction with these setpoints to compute a compressor outlet pressure setpoint. This computed information, along with knowledge about ambient pressure and temperature conditions and flow setpoints, is subjected to a recursive model or algorithm to determine future compressor operating conditions at the desired fuel cell system operating point. Quantities includable within these future compressor operating conditions are the predicted compressor inlet pressure, the future compressor recirculation valve flow, the required compressor total flow and the predicted steady state compressor inlet and outlet temperatures using an enthalpy mixing model and estimated compressor adiabatic efficiency. These predicted conditions are then used to determine a feedforward physical speed of the compressor based on the known operational conditions. In one preferred form, these known operational characteristics are consistent with (or derived from) the manufacturer's compressor map such that the data corresponding to those conditions may be placed into a conventional machine-readable form, such as through a lookup table or the like. The feedforward speed is used to bias the compressor speed control to the desired operating point of the system. In one form, the above predictive compressor speed control is implemented via computer-readable instructions.

In accordance with another aspect of the invention, a method of delivering reactant to a fuel cell stack in response to an operational transient is disclosed. In the present context, an operational transient includes events in the operating of the fuel cell stack that require a change in one or more operating conditions of the compressor. Thus, uptransients (where the compressor may be requested to deliver more air or related reactant to the cathode side of the fuel cell stack) and downtransients (where the compressor may be requested to deliver less air or related reactant to the cathode side of the fuel cell stack) would constitute an operational transient. The method includes configuring a controller to receive both fuel cell stack data and compressor data, where received data from both sources correspond to the operational transient. The method additionally includes using the controller to determine a compressor outlet pressure setpoint using the received data, as well as to determine one or more compressor operating conditions at a desired fuel cell stack operating point. Furthermore, the method includes using the controller to determine a feedforward compressor speed based on the compressor operating condition or conditions, as well as with compressor operational data (which may, in one form, come from a compressor map or other suitable means for coordinating the compressor's performance characteristics) and delivering through the controller a feedforward compressor speed control signal to the compressor to adjust the compressor's speed.

According to another aspect of the present invention, a fuel cell system is disclosed. The system includes a fuel cell stack made up of numerous individual fuel cells, each with an anode, a cathode and an electrolyte disposed between the anode and the cathode. Anode and cathode flowpaths are used to convey a respective first and second reactants to the numerous individual fuel cells. A fluid pumping device cooperates with the cathode flowpath such that the fluid pumping device can vary an amount of the second reactant delivered to the cathode portion of the stack. A controller provides instructions to the fluid pumping device in response to operational transients. More particularly, the controller is used to receive data corresponding to operating conditions of the fuel cell stack and the fluid pumping mechanism, from which it determines a future outlet pressure setpoint of the fluid pumping device, and also determines one or more operating conditions of the fluid pumping device at a desired fuel cell stack operating point. From this, the controller determines a feedforward speed command for the fluid pumping device; this command is based on the operating condition (or conditions) of the fluid pumping device, as well as from operational data of the fluid pumping device. From this, the controller delivers a feedforward control signal to adjust a speed of the fluid pumping device.

BRIEF DESCRIPTION OF THE DRAWINGS

The present disclosure will become more fully understood from the following detailed description, taken in conjunction with the accompanying figures, wherein like reference numerals refer to like elements, in which.

DETAILED DESCRIPTION OF THE PREFERRED EMBODIMENTS

Calculations performed in accordance with the present invention are preferably used in a predictive capacity to decide a future compressor operational position. Feedforward terms, such as the new setpoints, may be used, as may other parameters (such as the compressor speed or other feedback-based parameters). Furthermore, the controller may include proportional-integral-derivative (PID) capabilities to generate a compensational (i.e., feedback-based) term for the new operational position; this feedback-based term tries to eliminate the error (or difference) between the compressor setpoint and the present feedback value. As such, the new (or future or predicted) setpoint of the compressor is based predominantly on the sum of the feedforward (i.e., open-loop) term with an optional additional contribution from the feedback (i.e., closed-loop) term. It will be appreciated by those skilled in the art that the new compressor position, even though it may utilize feedback information (such as compressor speed or pressure or temperature) may not be based solely (or largely) on feedback information, as such is the target control term. In fact, the use of feedback-based input derives from part-to-part variation in each of the cathode components (such as due to manufacturing differences or the like); such variations may in fact make the use of feedback terms necessary. Contrarily, if no variation is present, then the feedforward term alone would be sufficient.

Parameters used to help the compressor move to a new operational setpoint may include one or more pieces of operational information taken from the compressor manufacturer's compressor map, as well as the fuel cell power system's nominal cathode flow resistance curve. In essence, the nominal cathode flow resistance curve shows the cathode flow path nominal pressure drop as a function of flow rate. In general, the resistance (or pressure drop) is zero at zero flow and increases asymptotically upward as the volume flow rate is increased. Details associated with this will be discussed in conjunction with FIG. 2 below, where a combination of first-order and second-order effects lead to such generally asymptotic behavior.

Figure 1:
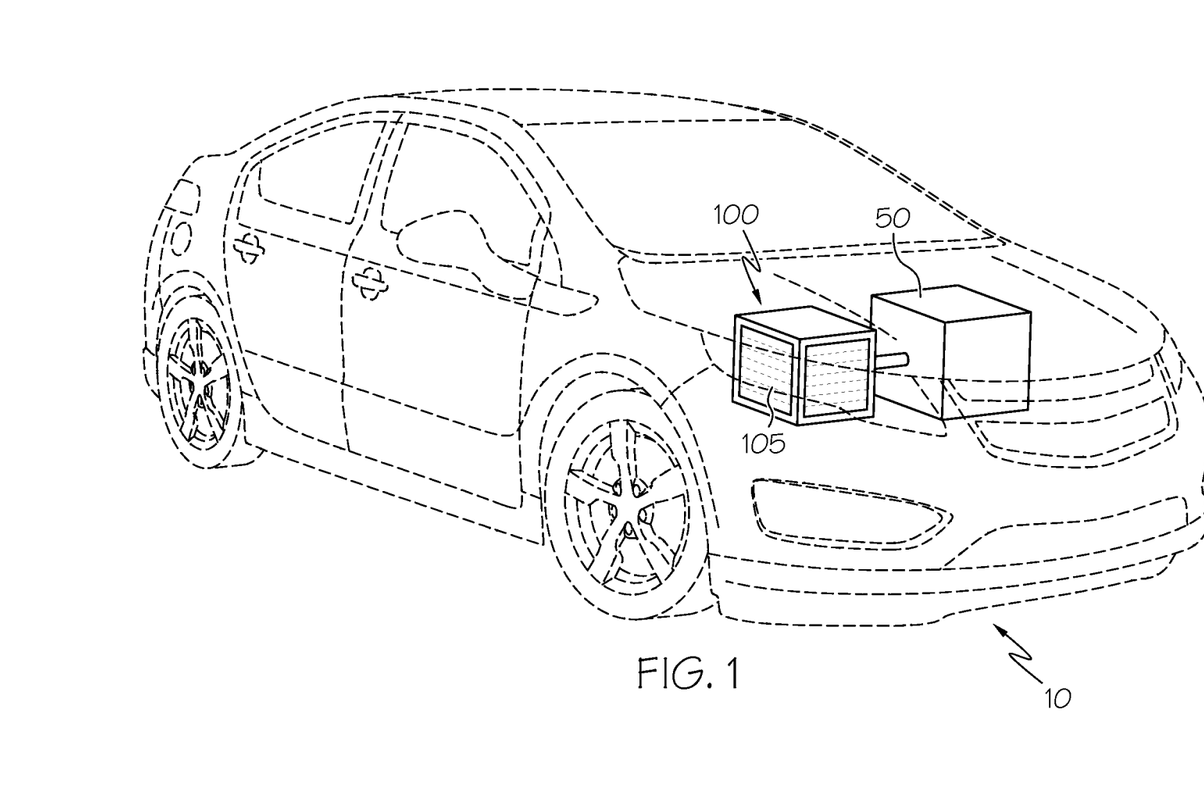
FIG. 1 shows the notional placement of a fuel cell system within a vehicular platform.

Referring first to FIG. 1, vehicle 10 is shown, according to embodiments shown and described herein. It will be appreciated by those skilled in the art that while vehicle 10 is presently shown configured as a car, it may also include bus, truck, motorcycle or related configurations. Vehicle 10 includes engine 50, which may be a fully electric or a hybrid electric engine (e.g., an engine that uses both electricity and petroleum-based combustion for propulsion purposes). A fuel cell system 100 that includes at least one stack 105 of individual fuel cells may be used to provide at least a portion of the electric power needs of engine 50. In a preferred form, the fuel cell system 100 is a hydrogen-based one that may include one or more hydrogen storage tanks (not shown), as well as any number of valves, compressors, tubing, temperature regulators, electrical storage devices (e.g., batteries, ultra-capacitors or the like), and controllers that provide control over its operation.

Any number of different types of fuel cells may be used to make up the stack 105 of the fuel cell system 100; these cells may be of the metal hydride, alkaline, electrogalvanic, or other variants. In one preferred (although not necessary) form, the fuel cells are polymer electrolyte membrane (also called proton exchange membrane, in either event, PEM) fuel cells. Stack 105 includes multiple such fuel cells 105A-N combined in series and/or parallel in order to produce a higher voltage and/or current yield. The produced electrical power may then be supplied directly to engine 50 or stored within an electrical storage device for later use by vehicle 10.

Figure 2:
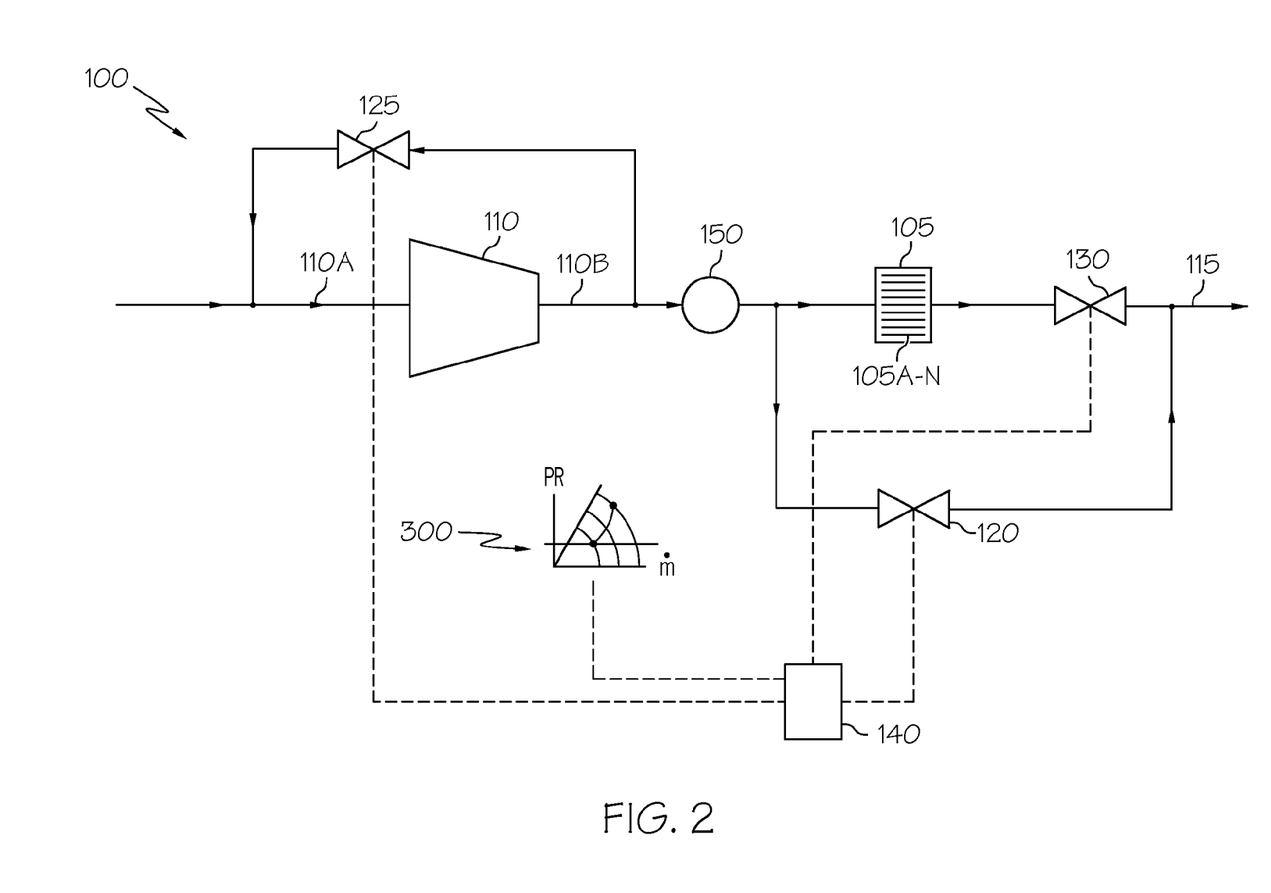
FIG. 2 shows a simplified view of some of the components used to deliver a pressurized reactant to a fuel cell stack of the fuel cell system of FIG. 1.

Referring next to FIG. 2, a schematic illustration of fuel cell system 100 is shown, according to embodiments shown and described herein. The system 100 includes a fuel cell stack 105 that is a combination of multiple fuel cells 105A-N in series, parallel or both as a way to produce a higher voltage or current yield than can be attained by a single fuel cell. A cathode compressor 110 is configured to receive reactant air at an inlet 110A and deliver it in pressurized form through outlet 110B to a cathode flowpath (not shown) of stack 105 where it is subsequently delivered to each of cells 105A-N, while reactant fuel (such as hydrogen) is delivered in comparable fashion to the anode side (not shown) of stack 105. Exhaust gases and/or liquids are then removed from stack 105 through discharge 115. A number of valves, such as bypass valve 120, recirculation valve 125 and backpressure valve 130, are included to facilitate desirable levels of flow through the respective parts of fuel cell system 100. For example, bypass valve 120 may be used to dilute the hydrogen left in the cathode of stack 105 for catalytic heating to reduce the emission (such as during stack warm-up), as well as for voltage suppression to let compressor 110 sink the stack load, while backpressure valve 130 may be used to help control pressures in stack 105 and recirculation valve 125 may be used in conjunction with compressor 110 to help stabilize fuel cell stack 105 cathode operation by coordinating the cathode's pressure and flow controls. In one form, the flow model associated with recirculation valve 125 uses the compressor outlet temperature to predict the valve flowrate. Stack 105 may also include a substantially closed-circuit coolant loop with radiator (neither of which are shown) as a way to remove excess heat generated by the electrochemical reaction of hydrogen and oxygen in the cells 105a-n. Likewise, a water vapor transfer unit (not shown) may also be placed in fluid communication with the anode and cathode circuits to act as a moisture exchange device.

A controller 140 regulates the speed of the compressor 110, as well as the opening and closing of one or more valves 120, 125 and 130. One or more meters or sensors 150 (such as temperature sensors, flow sensors, pressure sensors or the like) may be used to measure the operational parameters of the air being routed through system 100. The measured signals may be sent to the controller 140 for subsequent processing or decision-making. Likewise, known operational parameters may be stored within or accessed by controller 140 as a way to help provide control over one or more of the aforementioned components. One such example of known operational parameters may be embodied in a compressor map 300 such that information contained therein may be accessed by controller 140.

The shape of the nominal cathode flow resistance curve depends on the pressure drop of the individual components starting at the compressor outlet 110B through the fuel cell stack 105 where the pressure setpoint is desired. Some components exhibit more laminar (i.e., first-order (or linear)) behavior of the pressure drop versus flow rate, while some exhibit more turbulent-dominant (i.e., second-order) behavior versus the flow rate. Thus, the overall resistance curve has both first and second order terms. If the cathode flow rate and pressure setpoint are known, then by applying the resistance curve, the compressor outlet pressure can be predicted.

Figure 3:
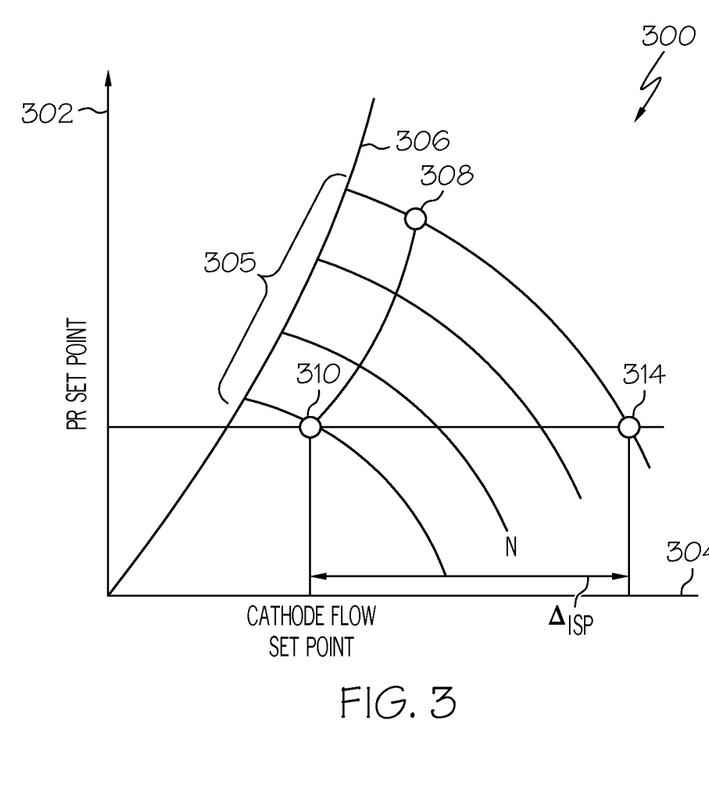
FIG. 3 shows a notional cathode compressor map that may serve as the basis for a mathematical algorithm that can be used as part of a feedforward control strategy according to an aspect of the present invention.

Referring next to FIG. 3, the compressor map 300 shown notionally in FIG. 2 is depicted in more detail. In one form, the map 300 may include numerous data points representative of the operational characteristics of compressor 110; these data points are typically provided by the compressor manufacturer, and may be based upon either test results or a predictive algorithm. Data contained in the compressor map 300 may include pressure ratios for given flow conditions (including, for example, factors pertaining to mass flow that may additionally take into consideration atmospheric temperature and pressure variations) at various speed lines. Compressor map 300 provides a useful tool to predict the behavior of the compressor 110 by allowing the prediction of flow setpoints based on the operating state. In one form, the data that corresponds to the various operational conditions across the compressor map 300 may be stored in a lookup table or related data structure that may in turn be embedded or otherwise contained within any suitable machine-accessible medium, such as a preprogrammed chip or memory device, such as those mentioned in more detail below. The data in the compressor map 300 may be pre-loaded into the controller 140 (discussed in more detail below) using information provided by, for example, the manufacturer of the compressor. In another form, the data can be built using a diagnostic routine that varies the operation of the compressor and detects various conditions; it will be appreciated by those skilled in the art that either of these forms are acceptable. Particulars associated with compressor map 300 are discussed in more detail below.

Typically, a compressor map 300 relates the pressure ratio of the compressor 110 to the airflow through the compressor 110, where the pressure ratio is shown along the y-axis 302. For example, the pressure ratio for compressor 110 depicted in FIG. 2 can be calculated by taking the ratio of pressure at outlet 110B to the pressure at inlet 110A. Map 300 also utilizes the compressor 110 mass flow rate of the reactant as x-axis 304. It is to be understood that compressor map 300 may be constructed using other values as well, where corrected flow values are typically employed on the x-axis as a way to normalize the performance of the compressor 110 to the expected inlet temperature and pressure conditions that will exist in the system into which the compressor 110 is installed. The computation of corrected flow uses both compressor 110 inlet temperature and pressure to account for inlet gas density changes that will in turn change the speed required to support desired flow and pressure setpoints.

The constant-speed lines 305 are made up of various semi-circumferential lines N that denote the speed of the compressor 110; for example, in situations where the compressor 110 is configured as an axial flow device, N could correspond to rotational speed in revolutions per minute, although a more common measure is as a percentage of its maximum-designed rotational speed. Regarding the present invention, compressor map 300 may be used to determine if a particular pressure, flow value, or compressor speed N that would result in the controller 140 establishing a feedforward control signal that would correspond to a desirable setpoint value for the new operating condition of compressor 110.

Surge line 306 delimits those compressor 110 operating states that result in an undesirable surge condition from those that do not. As shown, operating points to the left of surge line 306 result in a surge condition within the compressor 110, while operating points to the right of surge line 306 fall within a region of normal (i.e., acceptable) operation of the compressor 110. The distance between the operating point of the compressor 110 and surge line 306, also referred to as the surge margin, provides a measure of how close the compressor 110 is to a surge condition.

With regard to the particular example shown in the figure, a transient condition from 308 (high power) to 310 (lower power) is shown. The new low power command will have a lower cathode flow setpoint. Using the nominal cathode flow resistance curve, the outlet pressure prediction of compressor 110 at the new lower desired flowrate is calculated. Next, the compressor map 300 and several models consisting of the predictive compressor temperature inlet and outlet models, recirculation valve model, and compressor inlet pressure model are recursively called until they converge, establishing operating point 310 on the compressor map 300. Thus the new feedforward compressor speed is determined and sent to the compressor speed controller. Also, during the compressor speed transition, compressor recirculation valve 125 is opened to expedite the cathode flow transition. Given the quickness of the valve 125 compared to the sizeable rotational inertia of the compressor 110, when the valve 125 opens, the compressor pressure ratio will drop more quickly than the compressor speed. Therefore, the compressor flow will trend towards point 314 because the backpressure will drop faster than the compressor speed. Accordingly, the recirculation valve 125 will initially be commanded open to flow the difference between point 314 and 310 in an effort to bring the flow feedback closer to the desired setpoint more quickly. As the compressor 110 slows, the recirculation valve 125 will be gradually closed as the compressor speed moves closer to point 310 and the total compressor flow is reduced. Thus, for the desired cathode flow and pressure setpoints, the steady state inlet and outlet temperatures for compressor 110 are predicted as part of the aforementioned predictive temperature calculation. These values are important for many reasons, especially because the speed and power of compressor 110 are directly impacted by the inlet temperature (through temperature impacts on the inlet air density) and further because the flow model for recirculation valve 125 uses the temperature of compressor outlet 110B to predict the valve flowrate.

Figure 4:
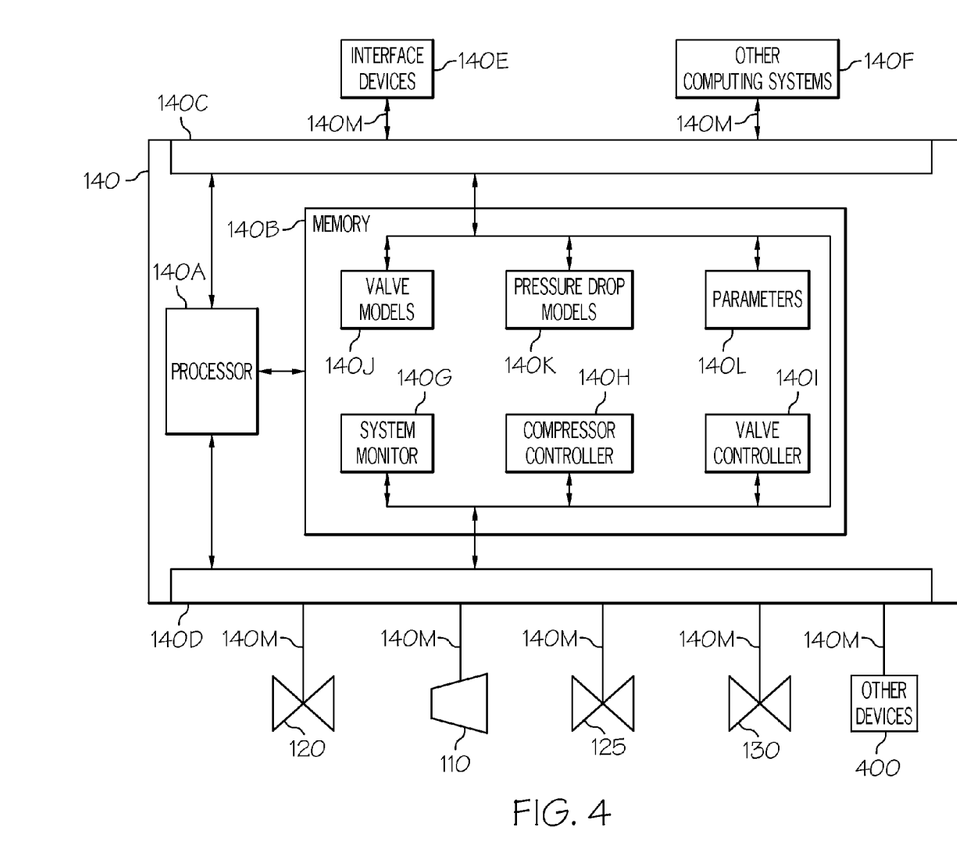
FIG. 4 shows a block diagram of a microprocessor-based controller and its signal interconnection with various components of FIG. 2.

Referring next to FIG. 4, more details associated with controller 140 are shown in simplified block format. Controller 140 communicates with various devices in fuel cell system 100 to gather data and related information (such as from the aforementioned sensors 150), as well (in some cases) to provide control over the devices, such as compressor 110 and the various valves 120, 125 and 130. For example, controller 140 may receive, either directly or indirectly, temperature, pressure, flow, density, valve position, speed or other measurements from sensors associated with compressor 110 or the other components. It should be appreciated that any number of different combinations of sensors and sensor configurations may be used, without deviating from the principles or teachings of the present disclosure.

As will be appreciated by those skilled in the art, controller 140 may function as a computer or related data processing device that includes at least an input, output, processing or related arithmetic logic unit, control and memory linked together; it will be appreciated by those skilled in the art that in such a configuration, controller 140 forms the basis of a von Neumann or related computer architecture. The mathematical algorithm or model of the present invention may generally be in the form of computer-readable program code means that in particular may be made up of one or more memory-loaded computational modules that are programmably configured to receive, send or otherwise operate upon parameters used for determining and establishing compressor setpoints based upon a requested change in compressor operation. In one aspect, the controller 140 is configured as a computer or related data processing equipment. The controller 140 includes components such as a processing unit 140A (also called a processor the structure of which may be in the form of one or more microprocessors) and memory 140B, as well as interfaces 140C and 140D that may serve as information input and output. Other equipment (such as displays) are shown generally as interface devices 140E, while interfaces with other computing systems are shown as 140F. It will be appreciated by those skilled in the art that these and other components are included in controller 140 in either a conventional von Neumann format or any other suitable configuration. For example, memory 140B may be in the form of random-access memory (RAM, also called mass memory, which can be used for the temporary storage of data) and instruction-storing memory in the form of read-only memory (ROM) As will be appreciated by those skilled in the art, controller 140 may exist as an autonomous (i.e., stand-alone) unit, or may be the part of a larger computer system.

In a particular form, computer-readable program code means that correspond to the present mathematical algorithm or model of the present invention may correspond to the one or more modules shown loaded into memory 140B as system monitor 140G, compressor control 140H, valve control 140I, valve models 140J, pressure drop models 140K and a stack flow offset generator 140L. Such computer-readable program code means may also be formed as part of an article of manufacture such that the instructions contained in the code are situated on a magnetically-readable or optically-readable disk or other related non-transitory machine-readable medium, such as a flash memory device, CD-ROM, DVD-ROM, EEPROM or floppy disk capable of storing machine-executable instructions and data structures. Such a medium is capable of being accessed by the controller 140 through one or more of the aforementioned components. As will be understood by those skilled in the computer art, controller 140 may include additional chipsets, as well as a bus and related wiring for conveying data and related information between the processor 140A and other devices (such as the aforementioned input, output and memory devices). Upon having the program code means loaded into memory 140B, the controller 140 becomes a specific-purpose machine configured to determine a compressor 110 operating point in a manner as described herein. Information corresponding to the compressor 110 (for example, compressor map data contained within compressor map 300) may be in the form of a database that may be stored in memory 140B or introduced into controller 140 via input 140C. Likewise, input 140C can be used to receive a user-initiated request for changes in operation of fuel cell system 100.

Connections 140M may be any combination of hardwired or wireless connections that provide connections between controller 140 and the respective components. In some embodiments, connections 140M are part of a shared data line that conveys measurement data to controller 140 and control commands to the devices of fuel cell system 100. In yet other embodiments, connections 140M may include one or more intermediary circuits (for example, other microcontrollers, signal filters or the like) and provide an indirect connection between controller 140 and compressor 110, valves 120, 125 and 130, as well as with and other devices 400. In one form, interface 140D may include one or more wired or wireless transceivers to correspond to comparable units in connections 140M. Interface 140D may also include circuitry configured to digitally sample or filter received measurement data, such as temperature data or other data needed to have controller 140 run through its algorithm. Such data can be collected at discrete times (e.g., k, k+1, k+2 or the like) to produce discrete temperature values (e.g., T(k), T(k+1), T(k+2) or the like).

In some embodiments, controller 140 may also communicate with interface devices 140E that may be in the form of a display, speaker, printer or any other electronic device that provides and/or receives data to and from a user; such communication may be through a connection 140M as discussed previously. Controller 140 may further communicate with other computing systems 140F, such as another controller, portable electronic device, server or the like, via connection 140M. Other computing systems 140F may include a server located remotely from vehicle 100 and connection 140M may be a wireless connection. For example, controller 140 may communicate status condition information to the server in other computing systems 140F via a cellular, WiFi, radio, satellite connection, or the like. Interface 140C may also include one or more transceivers configured to send and receive location information for vehicle 100. For example, interface 140C may include a global positioning system (GPS) receiver or cellular receiver that utilizes triangulation to determine the location of vehicle 100. In other embodiments, interfaces 140C and 140D may be a single interface for controller 140.

Memory 140B may be configured to include a system monitor 422 that receives sensor measurements from sensors 150 associated with fuel cell system 100. According to some embodiments, system monitor 140G may receive temperature, pressure or gas flow measurement at various locations within system 100, including various inlet and outlet locations corresponding to the compressor 110, valves 120, 125 and 130 or exhaust 115. In a preferred embodiment, memory 140B also can store, contain or cooperate with compressor control 140H that receives measurement data from system monitor 140G and uses the measured or sensed data to provide operating instructions to compressor 110 such that it can change its operating state, such as its speed N. Compressor control 140H may additionally or alternatively provide data to valve control 140I. In one preferred form, compressor control 140H may utilize the compressor map 300 of FIG. 3 to not only set the correct speed N, but also to avoid or mitigate undesirable operating conditions such as surge.

Valve controller 140I may also utilize pressure drop models 140K as part of its control over the valves of fuel cell system 102. In cases where pressure sensors are impractical or not used at a specific point in fuel cell system 100, pressure drop models 140K may be used to predict the pressure at that point. Pressure drop models 140K may utilize measurement data from system monitor 140G as part of the prediction. In some cases, pressure drop models 140K may also utilize one or more of setpoint and feedback data from compressor controller 140H or valve controller 140I as part of the pressure prediction. In one embodiment, pressure drop models 140J may be used to predict the inlet and outlet pressure of the valves 120, 125 and 130. For example, ambient pressure and exhaust temperatures from system monitor 140G, as well as the feedback compressor flow from compressor controller 140H may be used by pressure drop models 140K to determine a predicted pressure at the outlet of a particular valve 120, 125 or 130. Such information may be useful to the algorithm that is loaded into memory 140B, especially as it relates to the ability of controller 140 to calculate the appropriate compressor speed setpoint and send out a respective control signal. In some cases, memory 140B may also be used to store other parameters 140L. In the engine software of the present invention, computations (such as the air flow rate) are done external to the compressor FF speed controller; in one form, they may be generated by processor 140A.

Figure 6:
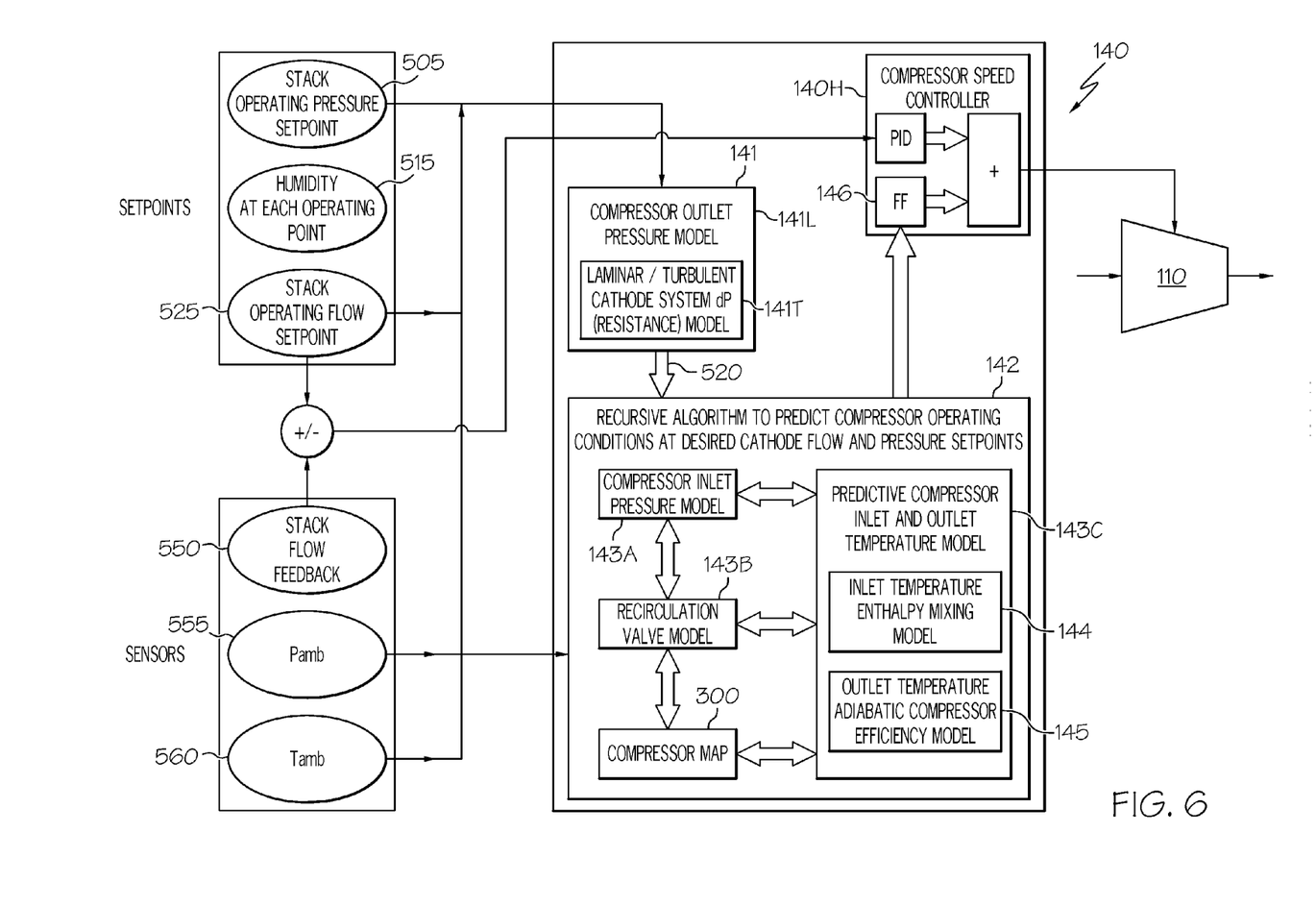
FIG. 6 shows a block diagram of various portions of the cathode compressor speed control in accordance with the present invention.

Referring next to FIG. 6, the operating pressure and cathode stoichiometry setpoints 505 and 510 for stack 105 are determined based on humidification requirements 515 for each operating point of the fuel cell system 102. Typical reference numbers for corresponding temperature and pressure ratios may be used from a conventional source, such as a standard day atmospheric condition of 59° F. (288K) and 14.7 psi (101.3 kPa). From this, a pressure drop model 141 that includes both laminar 141L and turbulent 141T elements is used to compute the compressor outlet pressure setpoint 520 using the pressure and cathode stoichiometry setpoints 505 and 510. As such, the compressor outlet pressure setpoint 520 is fed into the recursive algorithm 142. Likewise, the stoichiometric calculations that contribute to the required air intake setpoint or compressor assembly discharge setpoint are dictated by the current of fuel cell stack 105. For example, the air flow rate for such current is equal to 16.7 times the current (in amperes) times the number of cells 105A-N in stack 105 times the stoichiometry ratio, where the stoichiometry ratio is determined experimentally to achieve optimum system efficiency and stable operation of the stack 105 that is in turn tied mostly to stack flow channel air velocity for proper cell product water management. The stack flow feedback 550 is connected to the FF computation 146 through the compressor speed controller 140H in general, and through the PID controller in particular. Moreover, both Pamb 555, Tamb 560, and the stack operating flow setpoint 525 are used in the recursive algorithm 142. Further, the stack operating flow setpoint 525 and the stack operating pressure setpoint 505 are used in the compressor outlet pressure model 141.

The computed compressor outlet pressure and flow setpoints 520 (along with the ambient pressure $P_{AMB}$ and temperature $T_{AMB}$) are then used by a recursive algorithm 142 that solves for the future operating conditions 143 of compressor 110 at the desired fuel cell system 100 operating point. These conditions may include the predicted compressor inlet pressure, the future compressor recirculation valve flow, the required compressor total flow and the predicted steady state compressor inlet and outlet temperatures using an enthalpy mixing model 144 and estimated compressor adiabatic efficiency 145. These conditions and their importance are explained as follows. First, the predicted compressor inlet pressure is found from compressor inlet pressure model 143A as shown in FIG. 6, where in order to accurately determine the compressor 110 feedforward physical speed 146 for the desired operating condition, one must know the future compressor pressure ratio along the PR set point 302 of the compressor map 300 of FIG. 3; at the desired operating condition, this value is equal to the future compressor outlet pressure divided by the inlet pressure.

Likewise, the required total flow of compressor 110 is determined as follows. At low power, fuel cell stack 105 desired flow will be lower than the compressor 110 can support without entering the surge region of compressor 110. Therefore, the compressor 110 total flow must be set higher than the desired flow of stack 105. The remainder of the flow will be recirculated (such as through recirculation valve 125) and is calculated as the future compressor recirculation valve flow; once this quantity is known, then the predicted (i.e., future) steady state compressor inlet and outlet temperatures are computed. Significantly, all models go through this recursive process until they converge, after which the feedforward speed 146 is used to bias the control of the speed of compressor 110. As mentioned above, compressor 110 inlet temperature affects the speed and outlet temperature affects the recirculation valve model. Lastly, the feedforward speed 146 is used to bias the compressor speed control 140H, allowing the compressor 110 to move very quickly to the necessary speed N to meet the desired operating point of system 100. The present inventors have determined that in general, utilizing a feedforward term as part of the speed N control over cathode compressor 110 helps to stabilize the controller 140 better than utilizing a fully closed control loop (where the control is based only on a setpoint and feedback term).

Figure 5A:
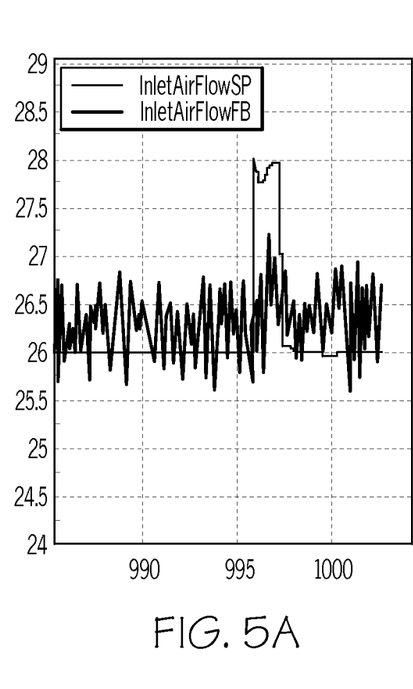
FIG. 5A shows a cathode compressor inlet air flow transient response according to the prior art.
Figure 5B:
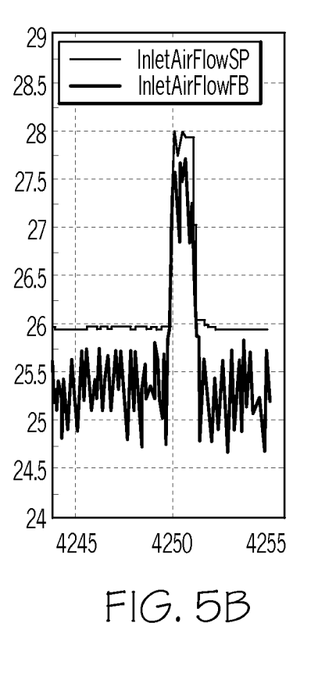
FIG. 5B shows a cathode compressor inlet air flow transient response in accordance with the present invention.

Referring next to FIGS. 5A and 5B, results of tests conducted on a simulated fuel cell system show the improvements made possible by the present invention. In particular, the present figures show flowrate versus time. Significantly, FIG. 5B shows with particularity that the feedback (i.e., inlet air flow FB) responds very quickly to the set point (i.e., inlet air flow SP) when compared to the situation shown in FIG. 5A. Thus, there is improvement in the cathode flow response with (FIG. 5B) and without (FIG. 5A) the feedforward term.

By providing an accurate speed target for compressor 110, additional capabilities, such as an active braking function, may also be employed. For example, compressor active braking could be used to slow the compressor 110 down more quickly by applying negative torque. This negative torque is generated by allowing the compressor 110 motor to place rotational energy back onto the electrical bus that it is connected to. By using a feedforward speed term in controller 140, the change of the speed setpoint is more abrupt, thereby making better use of the compressor active braking than if a slower, non-feedforward control was being used.

While the present disclosure has been particularly shown and described with reference to specific embodiments, it should be understood by those skilled in the art that various changes in form and detail may be made therein without departing from the spirit and scope of the disclosure as defined by the appended claims. More particularly, although the figures illustrate several embodiments of the present invention in detail, it should be understood that the application is not limited to the details or methodology set forth in the description or illustrated in such figures, and further that the terminology is for the purpose of description only and should not be regarded as limiting.

What is claimed is:

1. A method for predictively controlling the speed of a compressor used in conjunction with a fuel cell stack, said method comprising:
    receiving at a controller data corresponding to fuel cell stack and compressor operating conditions;
    determining through said controller a future compressor outlet pressure setpoint using a stack operating pressure setpoint, a cathode stoichiometry setpoint and said received data;
    determining through said controller at least one compressor operating condition at a desired fuel cell stack operating point;
    determining a feedforward compressor speed through said controller, said feedforward compressor speed based on said determined at least one compressor operating condition in conjunction with compressor operational data;
    determining a feedback term to eliminate error between the future compressor outlet pressure setpoint and the feedforward compressor speed, the feedback term is calculated using said fuel cell stack operating point and a stack flow feedback; and
    delivering through said controller a feedforward compressor speed control signal to said compressor to adjust a speed thereof wherein said feedforward compressor speed control signal is the sum of said feedforward compressor speed and said feedback term.

2. The method of claim 1, wherein said stack operating pressure and cathode stoichiometry setpoints are determined based on humidification requirements for each of a plurality of operating points of said stack.

3. The method of claim 1, wherein said determining a future compressor outlet pressure setpoint comprises operating a pressure drop model where both turbulent flow elements and laminar flow elements are used.

4. The method of claim 1, wherein said at least one future compressor operating condition is selected from the group consisting of predicted compressor inlet pressure, future compressor recirculation valve flow, required compressor total flow, predicted steady state compressor inlet temperature and predicted steady state compressor outlet temperature.

5. The method of claim 4, wherein said determining at least one future compressor operating condition at a desired fuel cell stack operating point further comprises using at least one of an enthalpy mixing model and an estimated compressor adiabatic efficiency.

6. The method of claim 1, wherein said compressor operational data is derived from a compressor pressure ratio setpoint and a corrected compressor discharge rate.

7. The method of claim 6, wherein said compressor pressure ratio setpoint and corrected compressor discharge rate is derived from a compressor map.

8. The method of claim 1, wherein said determining a feedforward compressor speed comprises recursively solving for said at least one future compressor operating condition.

9. The method of claim 8, wherein said at least one future compressor operating condition comprises at least one of predicted compressor inlet pressure, future compressor recirculation valve flow, required compressor total flow and predicted steady state compressor inlet and outlet temperatures using an enthalpy mixing model and estimated compressor adiabatic efficiency.

10. A method of delivering reactant to a fuel cell stack in response to an operational transient, said method comprising:
    receiving at a controller, fuel cell stack data and compressor data corresponding to said operational transient;
    using said controller to determine a desired fuel stack operating point;
    using said controller to retrieve from memory a humidity requirement at said desired fuel stack operating point;
    using said controller to determine a stack operating pressure setpoint, a cathode stoichiometry setpoint, and a stack operating flow setpoint, all based on said humidity requirement and wherein said cathode stoichiometry setpoint is determined from a current produced by said fuel cell stack;
    using said controller to determine a compressor outlet pressure setpoint using said fuel stack data, said compressor data, said stack operating pressure setpoint, said humidity operating setpoint, and said stack operating flow setpoint;
    using said controller to determine at least one compressor operating condition at said desired fuel cell stack operating point through a recursive algorithm utilizing a compressor inlet pressure model, a recirculation valve model, a compressor map, and said compressor outlet pressure setpoint;
    using said controller to determine a feedforward compressor speed based on said at least one compressor operating condition in conjunction with compressor operational data; and
    delivering through said controller a feedforward compressor speed control signal to said compressor to adjust a speed thereof.

11. A fuel cell system comprising:
    a fuel cell stack comprising a plurality of individual fuel cells each of which comprises an anode, a cathode and an electrolyte disposed between said anode and said cathode;
    an anode flowpath configured to convey a first reactant to said anodes of said plurality of individual fuel cells;
    a cathode flowpath configured to convey a second reactant to said cathodes of said plurality of individual fuel cells;
    a fluid pumping device cooperative with said cathode flowpath such that said fluid pumping device can vary an amount of said second reactant thereto; and
    a controller configured to provide instructions to said fluid pumping device in response to operational transients, said controller configured to:
        receive data corresponding to operating conditions of said fuel cell stack and said fluid pumping mechanism wherein said data comprises a stack flow feedback, an ambient pressure, an ambient temperature, a current of the fuel cell stack;
        determine a desired fuel stack operating point;
        retrieve from memory a humidity requirement at said desired fuel stack operating point;
        determine a stack operating pressure setpoint, a cathode stoichiometry setpoint, and a stack operating flow setpoint, all based on said humidity requirement and wherein said cathode stoichiometry setpoint is determined from said current produced by said fuel cell stack;

determine a future outlet pressure setpoint of said fluid pumping device using said received data, said stack operating pressure setpoint, said humidity operating setpoint, and said stack operating flow setpoint;

determine at least one operating condition of said fluid pumping device at said desired fuel cell stack operating point through a recursive algorithm utilizing a compressor inlet pressure model, a recirculation valve model, a compressor map, and said future pressure outlet setpoint;

determine a feedforward speed command for said fluid pumping device based on said at least one operating condition of said fluid pumping device in conjunction with said data of said fluid pumping device; and deliver a feedforward control signal to adjust a speed of said fluid pumping device.

12. The system of claim 11, wherein said fluid pumping device comprises a compressor.

13. The system of claim 12, wherein said feedforward control signal is is the sum of said feedforward compressor speed command and a feedback term, said feedback term is calculated using said fuel cell stack operating point and said stack flow feedback.

14. The method of claim 1, further comprising an active braking function wherein the feedforward compressor speed control signal is used to apply a negative torque to incur an abrupt change in the compressor speed.

15. The method of claim 1, wherein said cathode stoichiometry setpoint is determined from a current produced by said fuel cell stack.

16. The method of claim 1, wherein determining through said controller a future compressor outlet pressure further comprises determining a stack overflow setpoint.

17. The method of claim 10, wherein the recursive algorithm further utilizes an enthalpy mixing model and estimated compressor adiabatic efficiency to determine that at least one operating condition that corresponds to said operational transient.

18. The system of claim 17, wherein the at least one operating condition comprises a predicted compressor inlet pressure, a future compressor recirculation valve flow, a required compressor total flow, and a predicted steady state compressor inlet and outlet temperatures.

19. The system of claim 12, wherein the recursive algorithm further utilizes an enthalpy mixing model and estimated compressor adiabatic efficiency to determine that at least one operating condition that corresponds to said operational transient.

20. The system of claim 19, wherein the at least one operating condition comprises a predicted compressor inlet pressure, a future compressor recirculation valve flow, a required compressor total flow, and a predicted steady state compressor inlet and outlet temperatures.

* * * * *